(12) United States Patent
Dieberger

(10) Patent No.: US 7,299,418 B2
(45) Date of Patent: Nov. 20, 2007

(54) NAVIGATION METHOD FOR VISUAL PRESENTATIONS

(75) Inventor: Andreas Dieberger, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1161 days.

(21) Appl. No.: 09/954,329

(22) Filed: Sep. 10, 2001

(65) Prior Publication Data

US 2003/0048291 A1 Mar. 13, 2003

(51) Int. Cl.
*G06F 3/00* (2006.01)

(52) U.S. Cl. ............... 715/732; 715/835; 715/854; 715/848; 715/840

(58) Field of Classification Search ............... 345/730, 345/731, 732, 835, 854, 855, 848, 849, 850, 345/840, 841
See application file for complete search history.

(56) References Cited

U.S. PATENT DOCUMENTS

| | | | | |
|---|---|---|---|---|
| 5,204,947 A * | 4/1993 | Bernstein et al. | ........... | 715/854 |
| 5,366,203 A * | 11/1994 | Huffman | ............... | 254/362 |
| 5,500,936 A * | 3/1996 | Allen et al. | ............... | 715/808 |
| 5,539,658 A * | 7/1996 | McCullough | ............... | 715/730 |
| 5,640,522 A * | 6/1997 | Warrin | ............... | 715/732 |
| 5,680,233 A * | 10/1997 | Faris et al. | ............... | 349/61 |
| 5,737,552 A * | 4/1998 | Lavallee et al. | ............... | 715/720 |
| 5,812,135 A * | 9/1998 | Kotchey | ............... | 715/853 |
| 5,859,623 A * | 1/1999 | Meyn et al. | ............... | 715/730 |
| 5,884,056 A * | 3/1999 | Steele | ............... | 715/738 |
| 5,917,480 A * | 6/1999 | Tafoya et al. | ............... | 715/732 |
| 5,977,972 A * | 11/1999 | Bates et al. | ............... | 715/786 |
| 6,037,937 A * | 3/2000 | Beaton et al. | ............... | 715/764 |
| 6,108,001 A * | 8/2000 | Tuttle | ............... | 715/730 |
| 6,157,364 A * | 12/2000 | Kohler | ............... | 715/855 |
| 6,195,093 B1 * | 2/2001 | Nelson et al. | ............... | 715/732 |
| 6,262,736 B1 * | 7/2001 | Nelson | ............... | 715/854 |
| 6,292,188 B1 * | 9/2001 | Carlson et al. | ............... | 715/854 |
| 6,606,082 B1 * | 8/2003 | Zuberec et al. | ............... | 345/156 |
| 6,771,286 B2 * | 8/2004 | Emrani | ............... | 715/730 |
| 6,774,920 B1 * | 8/2004 | Cragun | ............... | 715/730 |
| 6,842,185 B1 * | 1/2005 | Mavrommati et al. | ............... | 715/844 |
| 2002/0140724 A1 * | 10/2002 | Qureshi et al. | ............... | 345/730 |
| 2005/0047681 A1 * | 3/2005 | Hori et al. | ............... | 382/305 |

OTHER PUBLICATIONS

Cowart, Mastering Windows 3.1, 1992, p. 67.*

(Continued)

*Primary Examiner*—Kristine Kincaid
*Assistant Examiner*—Ryan Pitaro
(74) *Attorney, Agent, or Firm*—Daniel E. Johnson

(57) ABSTRACT

A navigation tool permits a presenter to navigate through a presentation, while easily introducing supplemental material into the presentation. Presentation slides are represented as thumbnails on the screen of the presenter's monitor, and are preferably arranged in rows and columns. The rows may indicate a main narrative sequence, and the columns may include thumbnails of slides representing supplemental or background material. The presenter may proceed from one slide to the next using conventional mouse/cursor technology or a remote control device. To this end, a navigation tool is introduced permitting the presenter to easily proceed along a row or a column simply by simply selecting the correct button. A special button is dedicated to making larger jumps back to the main narrative.

40 Claims, 8 Drawing Sheets

OTHER PUBLICATIONS

Using Microsoft Office 97 Professional; ISBN: 0-7897-1396-9.*

C. C. Marshall et al., *VIKI: Spatial Hypertext Supporting Emergenty Structure*, ECHT '94 Proceedings, Sep. 1994, pp. 13-23.

M. Joyce, *Storyspace as a Hypertext System for Writers and Readers of Varying Ability*, Technical Briefing, Proceedings of the Third Annual ACM Conferene on Hyperrtex, Hypertext '91 Proceedings, Dec. 1991, pp. 381-387.

*XFR Hyperbolic Reader*. Websites: http://www.thetech.org and http://gorbet.com, no date.

S. McCloud's Comic Strip *Choose Your Own Carl—Section 1*. Website: http://www.scottmccloud.com, no date.

*The Eastgate Web Squirrel*, Visual Cyberspace. Website: http://www.eastgage.com, no date.

* cited by examiner

NAVIGATION METHOD FOR VISUAL PRESENTATIONS

TECHNICAL FIELD

The invention relates generally to technology for presenting information to an audience, and more particularly, to methods and systems for effectively presenting slides.

BACKGROUND

The goal of most business and academic presentations is to convey a large amount of information in a concise and coherent manner. This typically involves the visual medium, e.g., the showing of slides, which has become the preferred method with the advent of presentation software such as Microsoft's PowerPoint. A slide show generally consists of a number of slides that are arranged in a predetermined order. This order is then traversed by the presenter during the presentation as he or she navigates from slide to slide.

However, the complexity of some presentations begs for a departure from this traditionally linear arrangement. For example, presenters often prepare many more slides about a topic than they necessarily intend to use. By keeping some slides "in reserve", presenters have the option of covering one or more particular aspects of the presentation in greater detail should the need arise, e.g., as a result of a question from the audience or when the audience shows heightened interest. Presenters often keep such additional material in separate slide shows because current presentation tools provide inadequate support in a situation like this.

Slide sorters, which are essentially a collection of "thumbnails" (small visual representations of slides that are similar enough to the slides they represent to be recognizable as such, e.g., they may be simply miniature versions of the slides), provide a reasonably good overview of which slides are in a presentation. However, slide sorters typically arrange the slide thumbnails in a left-to-right, top-to-bottom arrangement. This arrangement, akin to how text is read in a book, does not present slides in one continuous linear arrangement, since there is a visual jump after every line (row) of slides. On the other hand, an arrangement of slides more complicated than a standard linear arrangement does not lend itself well to this kind of standard thumbnail representation.

Accordingly, there remains a need for a method of organizing and presenting slides that gives the presenter the flexibility to easily depart from a single predetermined sequence of slides.

SUMMARY OF THE INVENTION

Preferred implementations of the present invention permit the presenter or speaker to more easily navigate through a presentation, while giving the presenter greater flexibility in introducing supplemental material into the presentation. Presentation slides are advantageously represented as thumbnails on the screen of the presenter's monitor, and are preferably arranged in rows and columns. The rows may indicate a main narrative sequence, whereas the columns may include thumbnails of slides representing supplemental or background material. The presenter may proceed from one slide to the next using conventional mouse/cursor technology or a remote control device. To this end, a navigation tool is introduced permitting the presenter to easily proceed along a row or a column simply by selecting the correct button. A special "resume" button is dedicated to making larger jumps back to the main narrative.

Preferred implementations permit the audience to experience transitions from one slide to the next that are animated in such a way that the sequential structure of the presentation is reinforced in the mind of the viewer. For example, as the presenter moves along a row of thumbnails from left to right (or along a column from top to down), the slide projected onto the audience's screen may advantageously appear to rotate off the screen and make way for the newly selected slide. This gives the audience better appreciation as to how the presentation is progressing and how one slide is related informationally to the next slide. For example, if the presenter returns to the previous slide, the audience may be provided a visual cue to this effect.

One preferred implementation of the invention is a processor-based method of making a presentation to an audience, in which the processor is interfaced with a monitor. This method includes displaying on the monitor a first line of representations (e.g., thumbnails) of slides, in which the representations in the first line are arranged to correspond to a first sequence of slides, and the first sequence is predetermined to convey structure of the presentation. A second line of representations of slides (oriented at an angle to the first line) is also displayed on the monitor, in which the representations in the second line are arranged to correspond to a sequence of additional slides. The first line and the second line have in common a first representation corresponding to a first slide, and the additional slides are selected to supplement information represented in the first slide. This method further includes selecting the first slide and projecting the first slide onto a screen viewed by the audience, selecting a second slide and projecting the second slide onto the screen to further elaborate on information presented with respect to the first slide (in which the second slide has a corresponding representation that forms part of the second line and is also adjacent to the first representation), and selecting a third slide and projecting the third slide onto the screen (in which the third slide has a corresponding representation that forms part of the first line and is also adjacent to the first representation). In a preferred implementation of this method, the representations are thumbnails. Slides may be selected with a handheld remote control device that is in communication with the processor, or by selecting (on the monitor) thumbnails corresponding to the selected slides. In preferred implementations of this method, the first line and the second line are orthogonal to each other, with the first and second lines including a row of thumbnails of slides and a column of thumbnails of slides.

In one preferred implementation of the invention, there is provided a processor-based method of presenting information, in which the processor is interfaced with a monitor. This method includes displaying, on the monitor, a first line of representations (e.g., thumbnails) of slides and a plurality of second lines of representations of slides (in which the first line is interconnected with and oriented at an angle to each of the second lines), with the first line and each of the second lines corresponding to respective sequences of slides, and each of the sequences being arranged to facilitate the presentation of information to an audience. The method further includes selecting, in sequential order, a plurality of representations in the first line and projecting the slides corresponding to the selected representations in the first line onto a screen viewed by the audience. The method also includes selecting, in sequential order, a plurality of representations of slides in one of the second lines and projecting the slides corresponding to the selected representations in said one of the second lines onto the screen to further elucidate a slide whose representation is part of both the first line and said one of the second lines. Following said projecting of the slides corresponding to the selected representations in said one of the second lines, a plurality of additional representations in the first line are selected in sequential order, and the slides corresponding to the selected additional representations are projected onto the screen. In a preferred implementation of this method, the representations are thumbnails. The first line is preferably orthogonal to each of the second lines, with the first line and the plurality of second lines including at least one row of thumbnails of slides and at least one column of thumbnails of slides. In one implementation of this method, the first line is a column of thumbnails of slides, and the second lines are rows of thumbnails of slides; in another implementation, the first line is a row of thumbnails of slides, and the second lines are columns of thumbnails of slides.

In other implementations of the invention, there are provided computer program products for carrying out any of the methods herein.

DETAILED DESCRIPTION OF THE INVENTION

Figure 1:
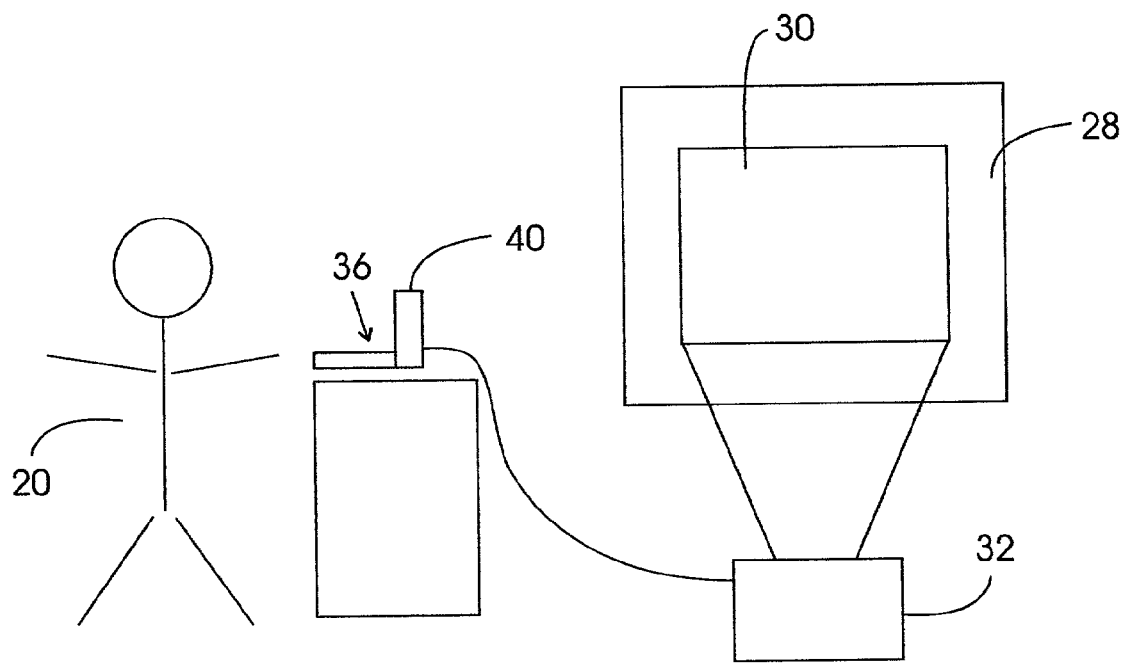
FIG. 1 shows an environment for implementing preferred methods herein, in which a presenter using a computer interfaced with a monitor projects information onto a screen viewed by an audience.

Preferred implementations of the invention give a presenter the ability to make spontaneous departures from a predetermined sequence of slides by providing the audience with additional detail as the situation arises. One such preferred implementation is shown in FIG. 1. A speaker or presenter 20 is making a presentation before an audience (which may or may not be in the same room as the presenter), whose attention is directed towards a screen 28 onto which an image 30 of a slide is displayed by a projector 32. The projector 32, which may be located either behind or in front of the screen 28, is electronically interfaced with (e.g., tied to) a lap top computer 36 (or other processor) where the presenter 20 selects which slide is projected onto the screen.

Figure 2:
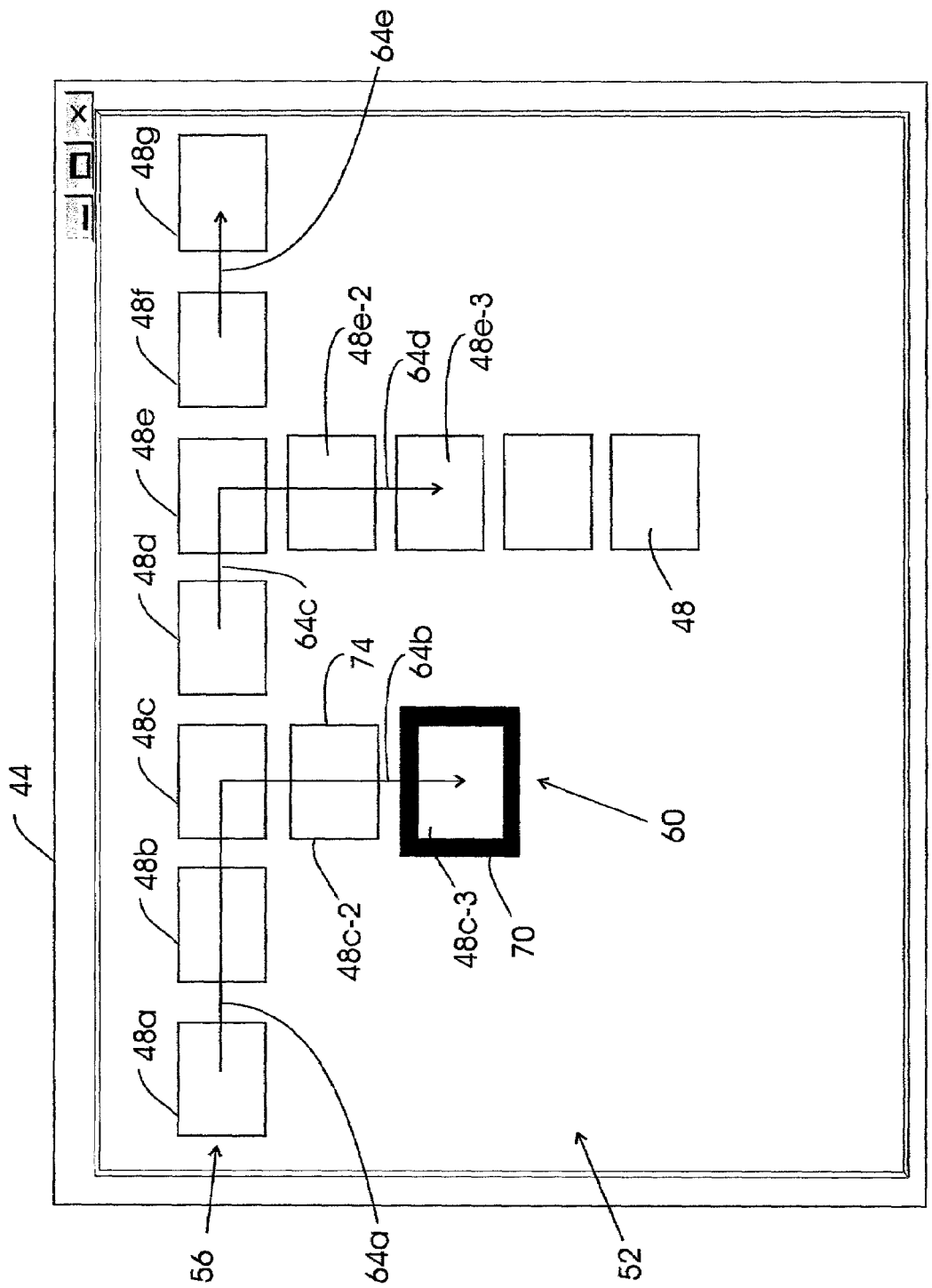
FIG. 2 shows the screen of the monitor on which the presenter's slides are displayed.

The computer 36 includes a monitor 40 whose screen 44 is shown in FIG. 2. The monitor screen 44 displays a number of representations of slides, e.g., as thumbnails 48. (Less preferably, a representation of a slide may be a title of the slide or any image or marker indicating the existence of the slide.) Taken together, the thumbnails 48 can be thought of as a global "map" 52 or overview of the presentation, including the presentation's most likely variations. This map 52 represents the presenter's main narrative (i.e., his or her main sequence of slides) as at least one continuous row 56 or line of thumbnails at the top of the map. On the other hand, additional slides representing supplemental material are arranged as lines or columns 60 of thumbnails of slides leading downwards from the row 56. By design, the slides in the columns 60 below the row 56 do not form part of the main sequence. Thus, the map 52 represents not just the presenter's main presentation, but it also displays additional material related to the main presentation that is available to the presenter and can be shown to the audience. Such additional material might include the sort of information that one would consider including in a "sidebar."

The structure of the presentation is suggested by the spatial arrangement of the thumbnails 48 in the map 52, in accordance with cultural conventions of movement along the (dominant) X and Y-axes from one thumbnail (representing one slide) to an adjacent thumbnail (representing another slide), in which objects lined up in a linear sequence are assumed to represent a continuous sequence. In the Western world, the reading style for text and other visual representations is left-to-right and top-to-bottom. Consistent with this convention, the linear arrangement of the thumbnails 48 in the top row 56 indicates the main narrative sequence, to be followed from left-to-right. On the other hand, the downward-directed paths or columns 60 of thumbnails 48 correspond to slides that represent supplementary or "in depth" material. (The methods herein may be adopted to suit other conventions, for example, the main narrative may be displayed along a column and supplemental information in rows.)

This linear arrangement is illustrated by the path segments 64a (along the row 56) and 64b (along the column 60), which represent part of a narrative sequence that might be used by a presenter. In this example, the three thumbnails 48a, 48b, 48c along the path segment 64a correspond to information related to the main narrative sequence. After presenting the slides corresponding to these three thumbnails 48a, 48b, 48c, the presenter elects to discuss material related to the thumbnail 48c in more detail. This departure from the main sequence is indicated by the path segment 64b, which traverses thumbnails 48c-2 and 48c-3. The slides corresponding to the thumbnails 48c-2 and 48c-3 correspond to information that may advantageously complement or expand upon points made by the presenter in connection with the slide represented by the thumbnail 48c. After this departure from the main sequence, the presenter returns to the main row 56 and presents slides corresponding to thumbnails 48d and 48e (along the path segment 64c) before making a narrative excursion along the path segment 64d that includes thumbnails 48e-2 and 48e-3, as illustrated in FIG. 2. The presenter then continues the presentation with slides corresponding to thumbnails 48f and 48g along the path segment 64e.

Visual markings on the screen 44 may be used to indicate to the presenter which slide is currently being shown, and other markings may be used to indicate which slides have already been shown at least once. The screen shot of FIG. 2 shows markings corresponding to that point in the presentation in which the presenter is currently showing and discussing the slide represented by the thumbnail 48c-3, but has not yet proceeded in the presentation beyond this point (e.g., the slides corresponding to the paths segments 64c, 64d, and 64e have not yet been shown). Accordingly, the thumbnail 48c-3 includes a thick dark border 70 around it, so that the presenter's attention is drawn to this thumbnail when he or she looks at the screen 44 of the monitor 40. A thinner dark border 74 is shown around the thumbnails 48a, 48b, 48c, and 48c-2 to remind the presenter that the slides corresponding to these thumbnails have already been shown to the audience. (Thus, the thick dark border 70 is transformed into the thinner dark border 74 after the presenter moves onto another slide. Additionally, color may be used to enhance this difference, e.g., the thick dark border 70 may be red, whereas the thinner dark border 74 may be green.) In this particular example, the remaining slides corresponding to the paths segments 64c, 64d, and 64e have not yet been shown to the audience, and consequently, no special markings on the other thumbnails are indicated. In preferred implementations of this visual markings method, the thick dark border 70 only appears around a thumbnail if the presenter has displayed the corresponding slide on the audience's screen 28 for a predetermined amount of time, e.g., for at least 3 or 5 seconds. As an alternative to using the darkened borders 70 and 74 to indicate which slides have already been presented, the thumbnails themselves may be highlighted in various ways.

Figure 3:
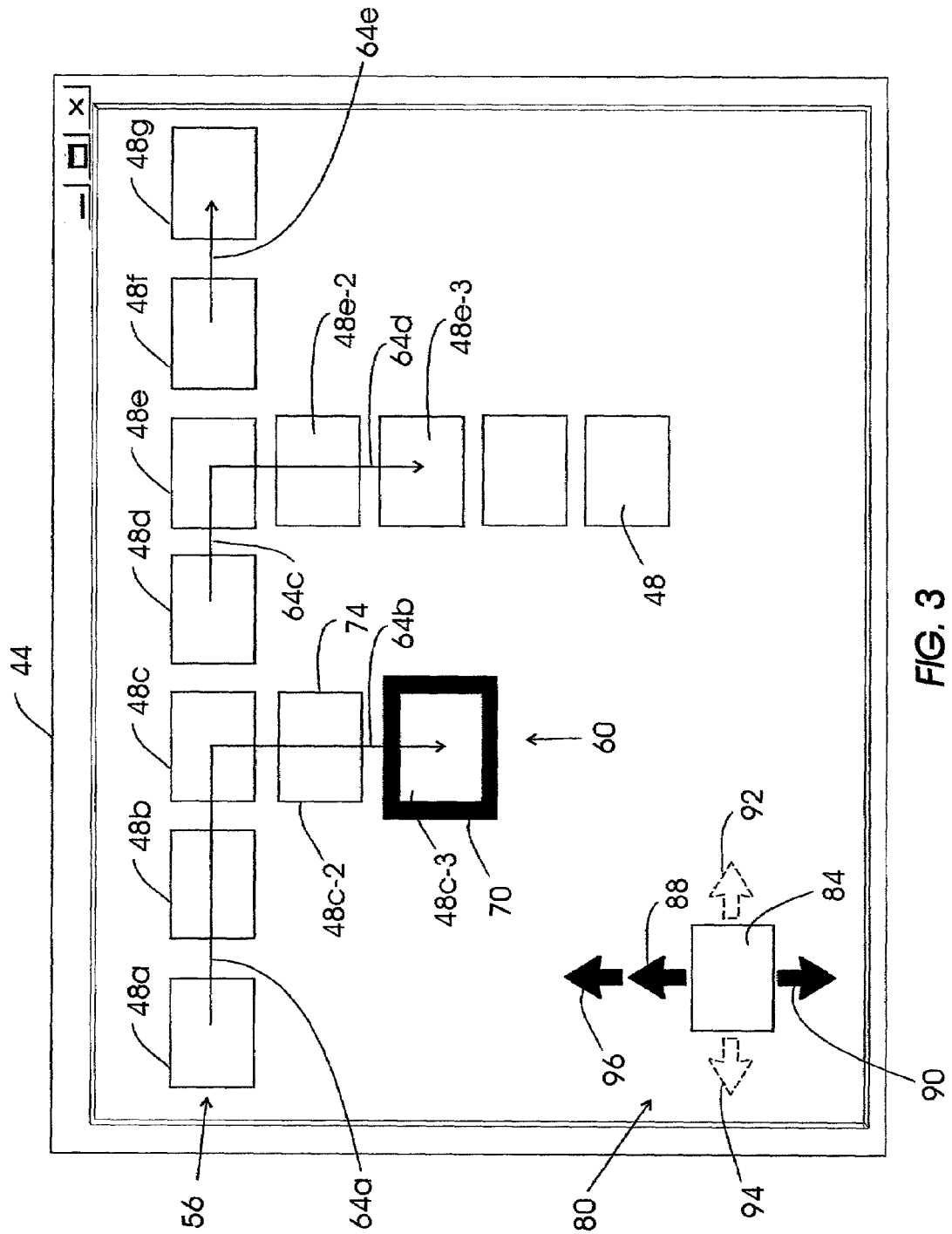
FIG. 3 shows a navigation tool on the monitor, in addition to the presenter's slides.

As shown in FIG. 3, the monitor screen 44 may advantageously include a navigation controller 80, in addition to the map 52. The controller 80 includes a thumbnail 84 corresponding to the slide currently being displayed to the audience. By way of example, consider the case in which the currently displayed slide corresponds to the thumbnail 48e-3. In this case, the thumbnail 84 would be the same as the thumbnail 48e-3. In addition, the controller 80 includes a series of navigation buttons 88, 90, 92, 94, 96 to assist the presenter make the transition from one slide to the next. In this particular example, the fact that the buttons 88 and 90 are enabled (e.g., darkened or highlighted) indicates to the presenter that there are thumbnails adjacent to the thumbnail 48e-3 that are above and below it, respectively. The presenter can access the corresponding slides by clicking on the buttons 88 and 90, e.g., by clicking on the button 88 the presenter returns to the slide represented by the thumbnail 48e-2. Two other navigation buttons 92 and 94 are in this case disabled, since there are no thumbnails in the map 52 that can be accessed by moving immediately to the right or left of the thumbnail 48e-3. Thus, the buttons 88, 90, 92, and 94 are enabled depending on whether there is a thumbnail in the map 52 that is, respectively, immediately above, below, to the right of, and to the left of the currently selected slide, which itself is indicated by the thumbnail 84. Accordingly, a presenter may proceed right through the main row 56 by beginning with the thumbnail 48a and repeatedly clicking on the right hand side navigation button 92. An advantageous aspect of this method is that whenever the "down" navigation button 90 becomes enabled, the presenter is alerted to the fact than supplemental material related to the currently displayed slide is available for presentation.

Clicking on the other remaining navigation button 96 (the "resume" button), on the other hand, allows the presenter to jump back to the main row 56 and resume the main narrative, regardless of how far along the presenter has "dug" into the column. In a preferred implementation of this navigation button technique, the presenter establishes in advance a preference with respect to the use of the button 96, allowing the presenter (beginning at the thumbnail 48e-3, for example), to either jump back to the main row 56 to the thumbnail 48e (which in this example would generally correspond to the last slide in the main sequence that was accessed by the presenter and shown to the audience) or to the thumbnail 48f (which in this example would generally correspond to the first slide in the main sequence that has not yet been shown to the audience).

The navigation buttons 88, 90, 92, 94, 96 may be mouse-clickable buttons located on the screen 44 of the monitor 40, as shown in FIG. 3. The mouse (not shown) interfaces with the computer 36 and controls a cursor on the monitor screen 44 that can be positioned over a navigation button which can then be selected by clicking the mouse. Alternatively, the navigation buttons 88, 90, 92, 94, 96 may be located on a separate device (not shown) that remotely controls the presentation by communicating with the computer 36. Such a separate navigation device could be a personal digital assistant (PDA) or a special remote control, in which buttons thereon are enabled (e.g., light up) to indicate the existence of possible navigation directions. As an alternative to using the navigation buttons 88, 90, 92, 94, 96, the presenter may click (using mouse/cursor technology such as that described above) directly on the thumbnail of any slide he or she wishes to display next, so that the selected slide is then displayed on the audience's screen 28. Directly clicking in this manner is helpful when "jumping" from the currently selected slide to a slide that is far removed from it (in the spatial sense, as indicated by the map 52). In a preferred implementation, jumping from one slide to another may be accomplished with a PDA or other special remote control like that discussed above. In the preferred implementations herein, the selected slide is projected by the projector 32 onto the screen 28 regardless of the technique used to select that slide.

Figure 4:
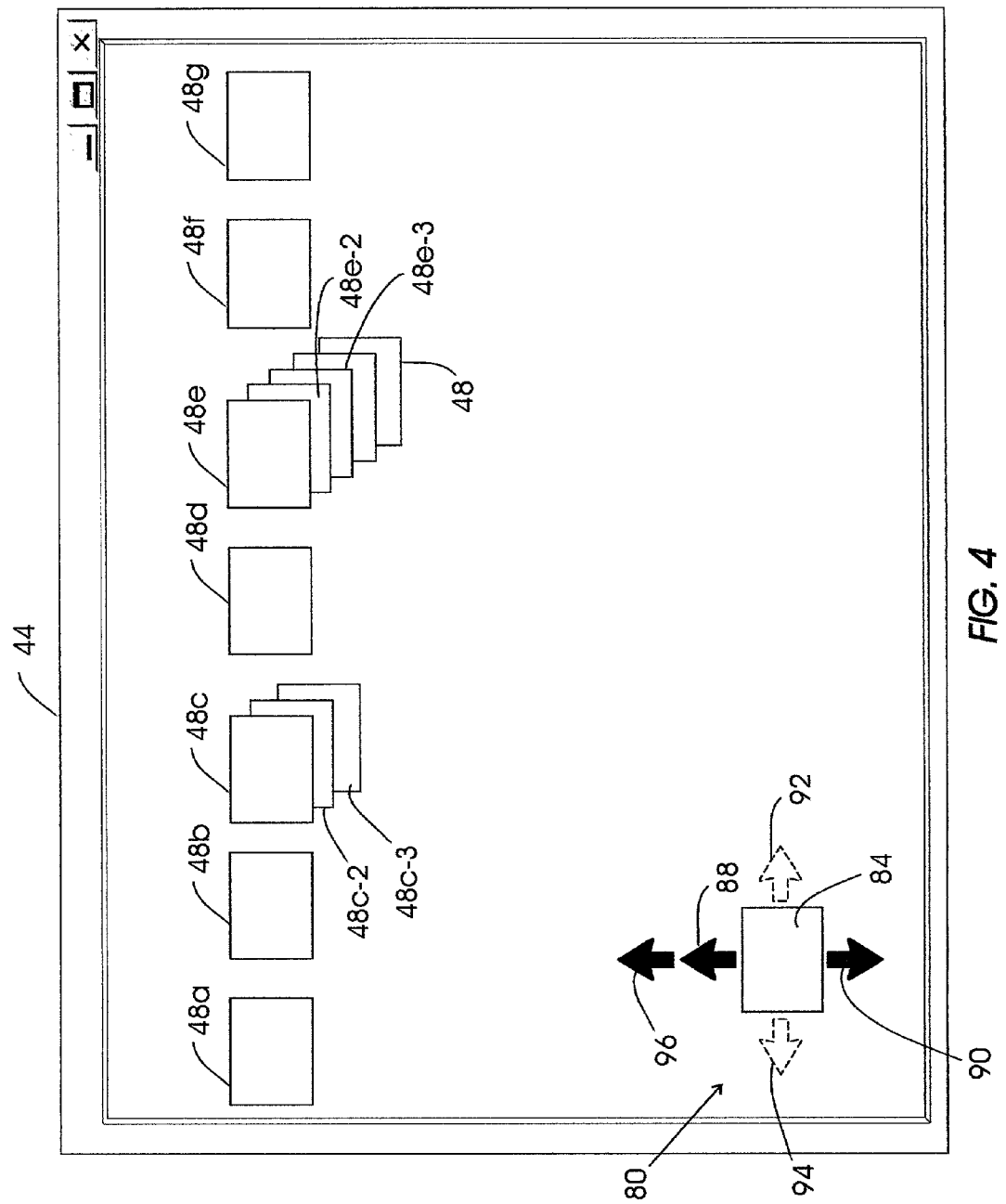
FIG. 4 shows how slides may be piled together.

As illustrated in FIG. 4, those thumbnails in the column 60 that do not form part of the row 56 (i.e., the thumbnails 48c-2 and 48c-3) may be advantageously "piled" underneath the thumbnail 48c. Likewise, thumbnails in other columns may be piled as well. This technique offers the presenter a more compact view of the map 52 on the monitor screen 44, while indicating to the presenter that additional material is available. Further, the presenter can assess relatively easily approximately how many thumbnails are in the pile. As the presenter moves into a side sequence given by a pile, the pile may advantageously expand on the monitor screen 44 so that all the originally piled thumbnails become visible. Further, once the presenter returns to the main sequence or jumps to another thumbnail in the map 52, the pile may advantageously reconstitute itself. A similar piling technique can be used to compactly represent long sequences of the main narrative (e.g., along a row).

Figure 5:
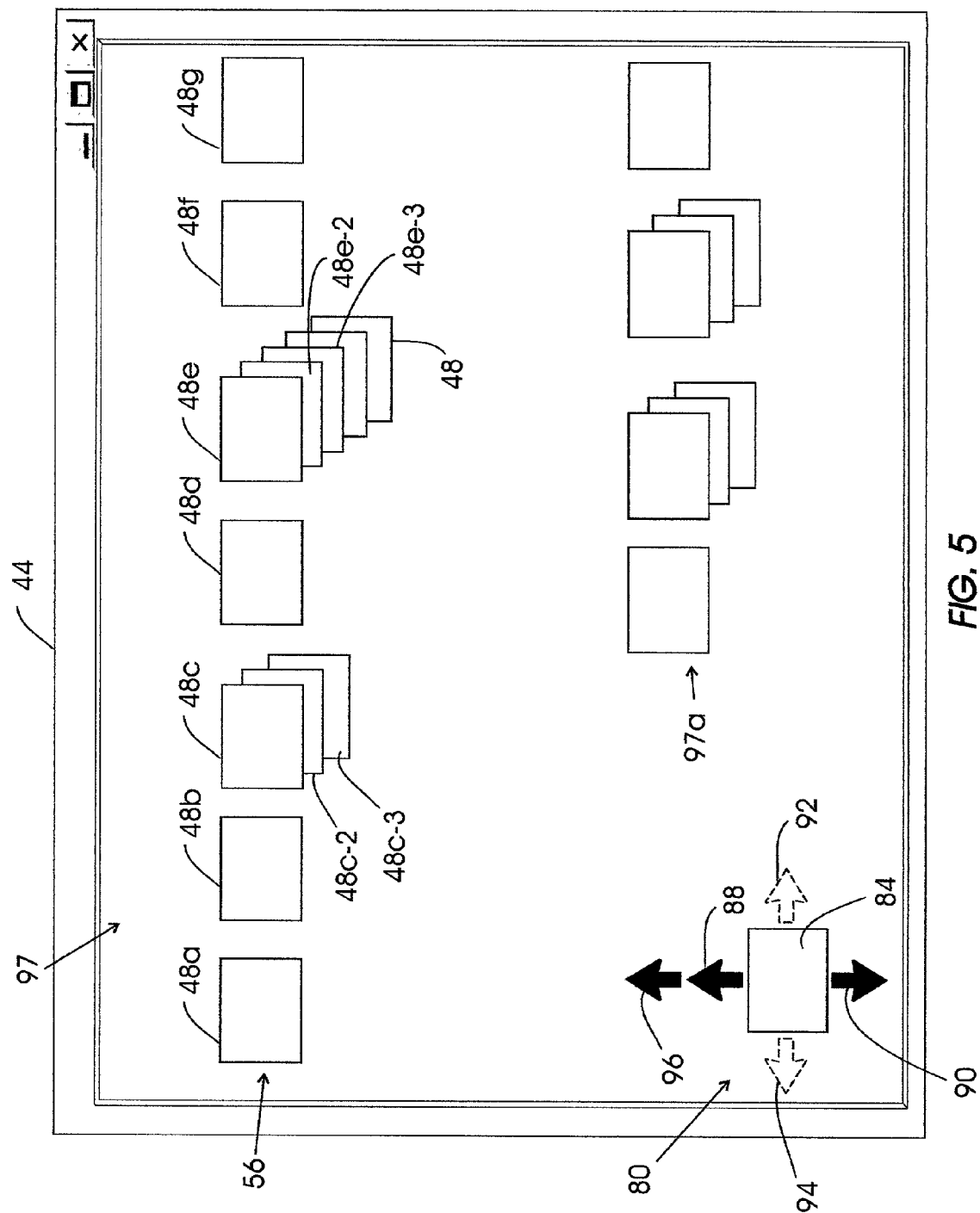
FIG. 5 shows that additional slides may be displayed on the screen in the form of additional columns and/or rows.

In FIG. 5 a more complicated map 97 is shown, in which unconnected sequences of thumbnails are shown. In particular, the monitor screen 44 shows the thumbnails of FIG. 1 (including the row 56) along with additional thumbnails in a row 97a, in which the additional thumbnails in the row 97a correspond to other slides.

Figure 6:
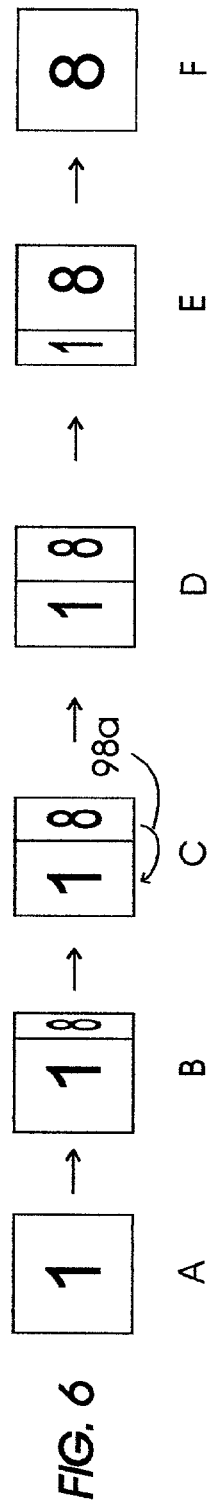
FIG. 6 shows how a slide viewed by the audience appears to rotate off the audience's viewing screen to make way for the next slide to be displayed.

In preferred implementations of the invention, the image 30 projected onto the screen 28 is visually animated in such a way that the audience can appreciate how the presenter is navigating through the map 52 of slides. The animations themselves are indicative of the direction of movement within the map 52. For example, when moving from left to right along a row, the slide on the right replaces the current slide, beginning at the right hand side of the displayed image. This is illustrated by the series of images shown in FIGS. 6A-6F. In FIG. 6A, the image 30 is simply the numeral "1", which is to be replaced by another image, namely, the numeral "8 ". In FIG. 6B, the numeral 8 becomes visible but appears compressed. The numeral 8 gradually decompresses and moves to the left throughout the sequence given by FIG. 6, while the numeral 1 is gradually compressed and disappears off the left hand side. The series of images illustrated in FIG. 6, when presented to the audience at the appropriate speed, gives the appearance of "rotation" in the direction indicated by the arrow 98a, as the numeral 8 appears to rotate out from behind of the numeral 1.

Figure 7:
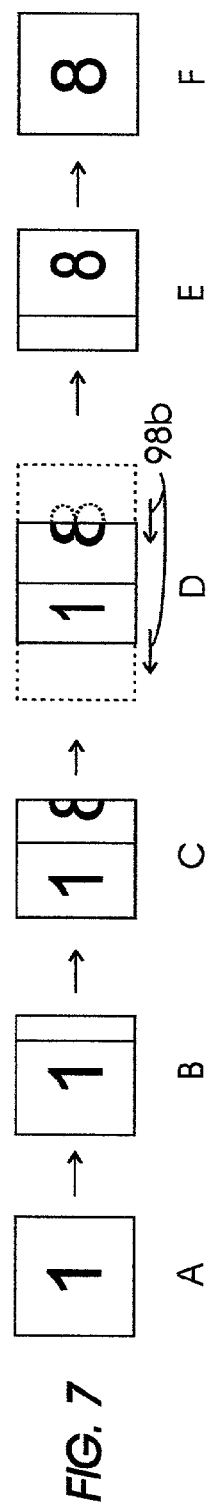
FIG. 7 shows how a slide viewed by the audience appears to translate off the audience's viewing screen to make way for the next slide to be displayed.

An alternative to the rotation technique illustrated in FIG. 6 is given in FIG. 7, in which one image appears to translate off the audience's screen 28 as another image takes its place in the direction indicated by the arrows 98b. In this technique, the numeral 1 (8) does not appear to be compressed (decompressed), but rather less and less (more and more) of the numeral 1 (8) is evident as one moves throughout the sequence represented by FIGS. 7A-7F. In FIG. 7D, the dotted lines and images indicate how the numerals would appear if the image size were increased to avoid any clipping of the numerals. Techniques analogous to those shown in FIGS. 6 and 7 may be used to suggest up/down movement along a column.

Figure 8:
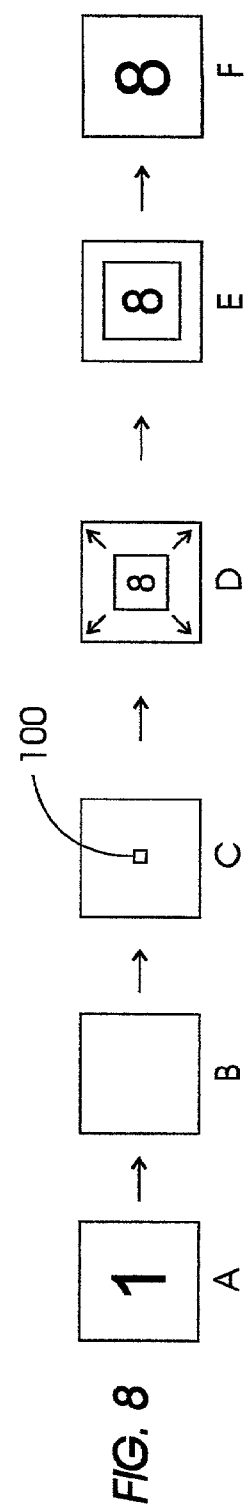
FIG. 8 shows how a slide viewed by the audience disappears from the audience's viewing screen to make way for the next slide to be displayed.

FIG. 8 illustrates a preferred technique for animation in the case that the presenter "jumps" across the map 52 from one thumbnail 48 to a non-adjacent thumbnail. Once again, example is made with reference to the numerals 1 and 8. FIG. 8A shows the numeral 1, which is the image 30 that appears on the audience's screen 28 before the jump. When the presenter jumps to another slide given by a non-adjacent thumbnail, the screen 28 viewed by the audience becomes temporarily blank, as illustrated in FIG. 8B. A small image 100 (see FIG. 8C) representing the newly selected slide then grows outward from the center of the screen 28; accordingly, this particular animation does not suggest any directionality. FIGS. 8D, 8E, and 8F illustrate how the small image 100 then expands to fill the screen 28. The speed with which the small image 100 expands to fill the screen 28 can be advantageously selected to indicate the separation (on the map 52) between the thumbnails representing the numerals 1 and 8, with less rapid transitions suggesting that the beginning and ending slides have corresponding thumbnails that are further apart on the map 52. (If a navigation controller such as controller 80 is used, e.g., in a hand held device used to select slides, the animation features described in connection with FIGS. 6, 7, and 8 may be advantageously incorporated into how the thumbnail 84 is displayed on the controller.)

Figure 9:
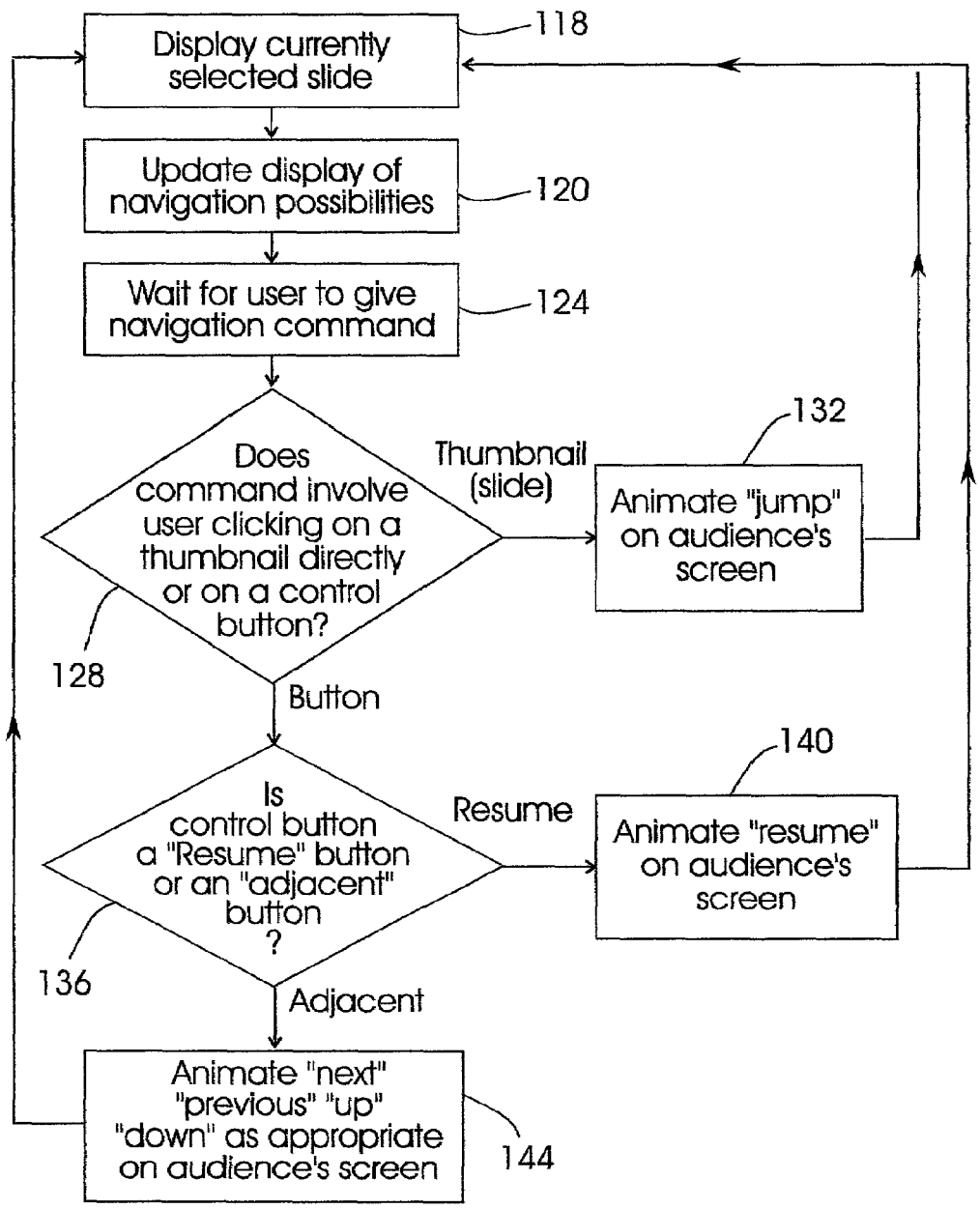
FIG. 9 shows a software flowchart illustrating the interaction between a user's navigation commands and the animation that is viewed by the audience.
Figure 10:
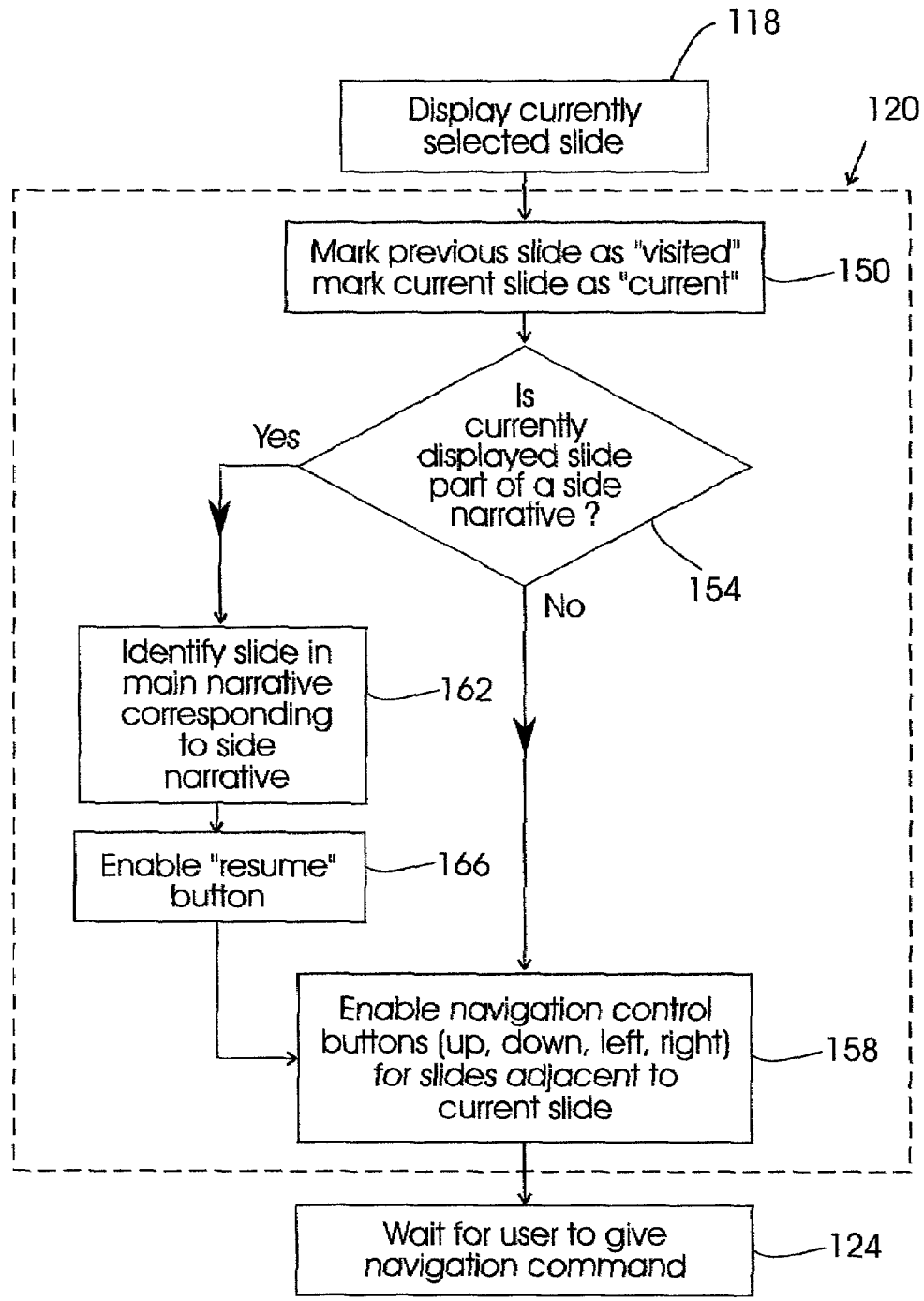
FIG. 10 shows a software flowchart illustrating how the display of navigation possibilities may be updated.

FIGS. 9 and 10 illustrate in flow chart form how software for realizing preferred implementations of the methods herein can be structured. As indicated by step 118, the currently selected slide is displayed on the audience's screen 28, while simultaneously being displayed as a thumbnail 84 within the navigation controller 80 (as described above in connection with FIG. 3). In addition, the universe of navigation possibilities is continually being updated (step 120), as discussed more fully in connection with FIG. 10. The system waits for the user (presenter) to give a navigation command (step 124), which may involve either clicking on a slide's thumbnail directly or selecting a control button of the navigation controller 80 (step 128). If the user has clicked on a thumbnail directly, animation like that outlined in FIG. 8 is executed (step 132). Alternatively, the user may have clicked on or otherwise selected one of the navigation buttons, which may be either the "resume" button 96 or one of the "adjacent" buttons 88, 90, 92, 94 corresponding to an adjacent thumbnail (step 136). If the user has selected the resume button 96, the appropriate animation is performed (step 140) (preferably like the animation depicted in FIG. 7); likewise, animation like that depicted in either FIG. 6 may be performed if one of the adjacent buttons 88, 90, 92, or 94 is selected by the user (step 144). After the appropriate animation represented by the step 132, 140, or 144 is displayed, the newly selected slide is displayed and the universe of navigation possibilities is once again updated (step 120).

FIG. 10 shows the step of updating the display of navigation possibilities (step 120) in greater detail. In step 150, the thumbnail of the previously displayed slide is marked as "visited" (i.e., already shown) by employing a marking such as the thin (green) border 74, whereas the thumbnail of the currently displayed slide may be marked with a thick (red) border 70, as discussed above in connection with FIG. 2. In step 154, a determination is made as to whether the currently displayed slide is in the main narrative portion of the presentation (e.g., corresponding to the row 56) or in a supporting or side narrative portion (e.g., slides corresponding to the thumbnails 48c-2 or 48c-3 in the column 60). If the currently displayed slide is not part of a supporting narrative, then only those navigation control buttons 88, 90, 92, 94 corresponding to thumbnails adjacent to the thumbnail of the currently displayed slide are enabled. If the currently displayed slide is part of a supporting narrative, then the slide in the main narrative corresponding to the supporting narrative is identified (step 162), and the navigation control "resume" button 96 is enabled (step 166), in addition to any other of the navigation control buttons (step 158).

Other implementations are contemplated in which the slides have additional materials associated with them, for example, video or audio clips. Depending on system settings established by the presenter, these additional materials could be automatically presented when a slide is being presented. For example, by associating audio files (or video files) with slides, the tool would allow the presenter to present audio (or video) materials to the audience. In addition, the slides could have presentation notes associated with them. Such notes could advantageously be visible only to the presenter and only when the slide with which they are associated is being presented. Such notes could, for example, be presented either on a separate monitor or on a handheld PDA controlling the presentation, in which the PDA is in communication with the computer 36.

One way of creating presentations that can be used with the methods described herein involves moving and arranging thumbnails of slides in a map space, e.g., in a working area similar to a computer desktop space. A user can advantageously import or drop slides into this space, with the slides showing up on the map as thumbnails, and with the user moving these thumbnails around at will, e.g., by dragging them with a mouse. To help the user keep the slides arranged along the 2 major axes, the preferred authoring embodiment defines a (visible or invisible) regular grid, in which slides snap onto the nearest grid point, much like the techniques employed in graphics editors.

In preferred implementations, such an authoring tool additionally allows a user to select several thumbnails at once in order to move, for example, a series of several slides as one group. This is useful when making space for additional slides or when moving parts of a presentation off to the side as background material. The authoring tool preferably further allows a user to easily change a horizontal series of thumbnails into a vertical one to turn a series of slides in to background material to be linked to the main narrative, or vice versa.

If the system supports attaching additional materials to a slide (such as audio files, movie files or presenter notes), the authoring system preferably provides functionality to create such an association with a slide's thumbnail. This could be achieved by opening an information window or information palette containing an area for entering comments and allowing users to select a file (e.g., one or more audio and/or video files) as an attachment to the slide of interest.

In preferred embodiments of the invention, there is provided media encoded with executable program code to effect any of the methods described herein. These media may include a magnetic or optical disk or diskette, for example. In preferred embodiments, this program code may be read by a digital processing apparatus such as a computer for performing any one or more of the methods disclosed herein.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

What is claimed is:

1. A processor-based method of making a presentation to an audience, in which the processor is interfaced with a monitor, comprising:
    displaying on the monitor a first line of representations of slides, wherein the representations in the first line are arranged to correspond to a first sequence of slides, the first sequence predetermined to convey structure of the presentation;
    displaying on the monitor a second line of representations of slides oriented at an angle to the first line, wherein the representations in the second line are arranged to correspond to a sequence of additional slides, the first line and the second line having in common a first representation corresponding to a first slide, the additional slides selected to supplement information represented in the first slide;
    selecting the first slide and projecting the first slide onto a screen viewed by the audience;
    selecting a second slide and projecting the second slide onto the screen to further elaborate on information presented with respect to the first slide, wherein the second slide has a corresponding representation that forms part of the second line and is also adjacent to the first representation; and
    selecting a third slide and projecting the third slide onto the screen, wherein the third slide has a corresponding representation that forms part of the first line and is also adjacent to the first representation.

2. The method of claim 1, wherein the representations are thumbnails.

3. The method of claim 2, wherein slides are selected by selecting, on the monitor, thumbnails corresponding to the selected slides.

4. The method of claim 2, wherein slides are selected with a handheld remote control device that is in communication with the processor.

5. The method of claim 2, wherein the first line and the second line are orthogonal to each other, the first and second lines including a row of thumbnails of slides and a column of thumbnails of slides.

6. The method of claim 5, comprising displaying on the monitor additional thumbnails corresponding to respective additional slides, wherein the additional thumbnails are not adjacent to either the first line or the second line.

7. The method of claim 5, further comprising displaying a currently selected thumbnail on a portion of the monitor, wherein said portion is away from where the first line and the second line are displayed on the monitor, so that said currently selected thumbnail appears on said portion of the monitor and also in at least one of the first and second lines while the slide corresponding to the currently selected thumbnail is viewed by the audience.

8. The method of claim 7, further comprising displaying orientation markings in said portion, the markings indicating the existence of any thumbnails in the first line or the second line that are adjacent to the currently selected thumbnail.

9. The method of claim 7, comprising:
    displaying a special marking in said portion; and
    selecting the special marking, thereby presenting to the audience one of the slides in the first sequence of slides.

10. The method of claim 5, comprising presenting slides to the audience in an animated way, in which a slide currently displayed on the screen appears to move off the screen to make way for a next slide to be displayed on the screen, wherein the direction of said movement conveys information about one of said sequences.

11. The method of claim 5, comprising presenting to the audience slides in an animated way, in which a slide currently displayed on the screen disappears from the screen to make way for a next slide to be displayed on the screen, wherein the thumbnail of said next slide is not adjacent, on the monitor, to the thumbnail of the currently displayed slide.

12. A processor-based method of presenting information, in which the processor is interfaced with a monitor, comprising:
    displaying, on the monitor, a first line of representations of slides and a plurality of second lines of representations of slides, the first line interconnected with and oriented at an angle to each of the second lines, the fist line and each of the second lines corresponding to respective sequences of slides, each of the sequences being arranged to facilitate the presentation of information to an audience;
    selecting in sequential order, a plurality of representations in the fist line and projecting the slides corresponding to the selected representations in the first line onto a screen viewed by the audience;
    selecting, in sequential order, a plurality of representations of slides in one of the second lines and projecting the slides corresponding to the selected representations in said one of the second lines onto the screen to further elucidate a slide whose representation is part of both the first line and said one of the second lines; and
    following said projecting of the slides corresponding to the selected representations in said one of the second lines, selecting, in sequential order, a plurality of additional representations in the first line and projecting the slides corresponding to the selected additional representations onto the screen.

13. The method of claim 12, wherein the representations are thumbnails.

14. The method of claim 13, wherein the first line is orthogonal to each of the second lines, the first line and the plurality of second lines including at least one row of thumbnails of slides and at least one column of thumbnails of slides.

15. The method of claim 13, wherein the first line is a column of thumbnails of slides, and the second lines are rows of thumbnails of slides.

16. The method of claim 13, wherein the first line is a row of thumbnails of slides, and the second lines are columns of thumbnails of slides.

17. The method of claim 14, wherein the information presented to the audience includes audio content.

18. The method of claim 14, wherein the information presented to the audience includes video content.

19. The method of claim 14, comprising arranging the thumbnails in said one of the second lines on the monitor in a piled manner.

20. The method of claim 14, comprising displaying on the monitor additional thumbnails corresponding to respective additional slides, wherein the additional thumbnails are not adjacent to either the first lines or the second lines.

21. The method of claim 14, comprising displaying on the monitor additional thumbnails corresponding to respective additional slides, wherein the additional thumbnails are arranged in at least one additional row and at least one additional column. wherein said at least one additional row and said at least one additional column are not connected to either the first lines or the second lines.

22. The method of claim 21, further comprising presenting to the audience information corresponding to said respective additional slides.

23. The method of claim 14, further comprising displaying a currently selected thumbnail on a portion of the monitor, wherein said portion is away from where the first line and the second lines are displayed on the monitor, so that said currently selected thumbnail appears on said portion of the monitor and also in at least one of the first and second lines while the slide corresponding to the currently selected thumbnail is viewed by the audience.

24. The method of claim 23, further comprising displaying orientation markings in said portion, the markings indicating the existence of any thumbnails in the first line or the second lines that are adjacent to the currently selected thumbnail.

25. The method of claim 24, wherein the orientation markings are highlighted to indicate the existence of any thumbnails in the first line or the second lines that are adjacent to the currently selected thumbnail.

26. The method of claim 23, comprising:
displaying a special marking in said portion; and
selecting the special marking, thereby presenting to the audience a slide corresponding to a thumbnail in the first line.

27. The method of claim 14, comprising presenting slides to the audience in an animated way, in which a slide currently displayed on the screen appears to move off the screen to make way for a next slide to be displayed on the screen, wherein the direction of said movement coveys information about one of said sequences.

28. The method of claim 27, wherein the currently displayed slide appears to rotate during said movement.

29. The method of claim 27, wherein the currently displayed slide appears to translate during said movement.

30. The method of claim 27, wherein the speed of said movement corresponds to how far the next slide is separated, in the sequential sense, from the currently displayed slide.

31. The method of claim 14, comprising presenting to the audience slides in an animated way, in which a slide currently displayed on the screen disappears from the screen to make way for a next slide to be displayed on the screen, wherein the thumbnail of the next slide is not adjacent, on the monitor, to the thumbnail of the currently displayed slide.

32. The method of claim 14, comprising providing on the monitor, near a thumbnail whose corresponding slide is currently being presented to the audience, a first kind of marking to indicate to a presenter that that slide is in fact the slide being presented to the audience.

33. The method of claim 32, comprising providing on the monitor, near thumbnails corresponding to slides that have already been presented to the audience, a second kind of marking to indicate to the presenter that those slides have already been presented to the audience.

34. The method of claim 14, wherein slides are selected by a presenter with a remote control device tat communicates with the processor.

35. A computer program product comprising a machine-readable medium having computer-executable program instructions thereon for carrying out the method of claim 1.

36. A computer program product comprising a machine-readable medium having computer-executable program instructions thereon for crying out the method of claim 12.

37. The method of claim 1, wherein said selecting and projecting the second slide represents a presenter's spontaneous departure from the first sequence of slides, thereby providing the audience with additional detail.

38. The method of claim 1, wherein only some of the additional slides are shown to the audience.

39. The method of claim 12, wherein said selecting and projecting slides corresponding to said one of the second lines represents a presenter's spontaneous departure from the first sequence of slides, thereby providing the audience with additional detail.

40. The method of claim 39, wherein only some of the slides corresponding to said one of the second lines are shown to the audience.

* * * * *